United States Patent
Abramo

(10) Patent No.: US 7,360,153 B1
(45) Date of Patent: Apr. 15, 2008

(54) METHOD AND APPARATUS FOR IMPORTING DIGITAL SWITCHING SYSTEM DATA INTO A SPREADSHEET PROGRAM

(75) Inventor: Loredana Abramo, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/483,745

(22) Filed: Jan. 17, 2000

(51) Int. Cl.
G06F 15/00 (2006.01)
(52) U.S. Cl. ..................................................... 715/503
(58) Field of Classification Search ................ 715/503, 715/500, 504, 509, 530; 370/250, 251; 709/200
See application file for complete search history.

(56) References Cited

U.S. PATENT DOCUMENTS

| | | | | |
|---|---|---|---|---|
| 3,860,761 A | * | 1/1975 | O'Neill, Jr. .................. 370/388 |
| 4,017,840 A | * | 4/1977 | Schild et al. ................ 711/164 |
| 4,552,997 A | * | 11/1985 | Daniels et al. .............. 370/250 |
| 4,558,188 A | * | 12/1985 | Stuparits et al. ......... 379/29.08 |
| 5,166,925 A | * | 11/1992 | Ward .......................... 370/250 |
| 5,187,733 A | * | 2/1993 | Beffel et al. ................ 379/9.06 |
| 5,291,543 A | * | 3/1994 | Freese et al. ................ 455/408 |
| 5,384,822 A | * | 1/1995 | Brown et al. ............ 379/15.01 |
| 5,596,623 A | * | 1/1997 | Uchiba et al. ........... 379/29.01 |
| 5,623,656 A | * | 4/1997 | Lyons .......................... 707/10 |
| 5,655,015 A | * | 8/1997 | Walsh et al. ........... 379/201.04 |
| 5,661,789 A | * | 8/1997 | Boyle et al. ........... 379/207.02 |
| 5,664,208 A | * | 9/1997 | Pavley et al. ............... 715/515 |
| 5,796,953 A | * | 8/1998 | Zey ............................ 709/227 |
| 5,832,481 A | * | 11/1998 | Sheffield ........................ 707/4 |
| 5,893,123 A | * | 4/1999 | Tuinenga .................... 715/504 |
| 5,940,473 A | * | 8/1999 | Lee .......................... 379/10.01 |
| 5,953,730 A | * | 9/1999 | Schawer ..................... 715/503 |
| 6,005,696 A | * | 12/1999 | Joline et al. .................. 398/25 |
| 6,134,314 A | * | 10/2000 | Dougherty et al. ..... 379/201.01 |
| 6,154,748 A | * | 11/2000 | Gupta et al. ................. 707/102 |
| 6,226,516 B1 | * | 5/2001 | Gupta et al. ................. 455/433 |
| 6,259,698 B1 | * | 7/2001 | Shin et al. ................. 370/395.7 |
| 6,269,337 B1 | * | 7/2001 | Desmond et al. ......... 704/270.1 |
| 6,285,745 B1 | * | 9/2001 | Bartholomew et al. .. 379/88.17 |
| 6,307,925 B1 | * | 10/2001 | Bailis et al. ................. 379/136 |
| 6,317,484 B1 | * | 11/2001 | McAllister ............... 379/88.02 |
| 6,389,407 B1 | * | 5/2002 | Paradis et al. ................ 706/47 |
| 6,466,956 B1 | * | 10/2002 | Cho et al. ..................... 715/531 |
| 6,470,349 B1 | * | 10/2002 | Heninger et al. ........... 707/102 |
| 6,480,749 B1 | * | 11/2002 | Lee et al. ...................... 700/32 |
| 6,501,953 B1 | * | 12/2002 | Braun et al. ................. 455/436 |
| 6,546,003 B1 | * | 4/2003 | Farris .......................... 370/352 |
| 6,546,523 B1 | * | 4/2003 | Boorananut et al. ........... 716/4 |
| 6,549,918 B1 | * | 4/2003 | Probert et al. .............. 707/203 |
| 6,552,832 B1 | * | 4/2003 | Beierle et al. .............. 370/478 |

(Continued)

*Primary Examiner*—Cong-Lac Huynh

(57) ABSTRACT

A method and apparatus for importing digital switching system data into a spreadsheet program. Via the switch data examiner of the present invention, raw data from a digital switch/switching system such as the 5ESS® is converted by the switch data examiner to a format compatible with a spread sheet such as Microsoft® Excel, and output to worksheets and workbooks of the spreadsheet for easy accessing, and modifying data by users such as customer technical support engineers, testers, and Operation, Administration and Maintenance personnel. In contradistinction to the prior art, the user need not access the switch data one entry at a time, or download all data into a text file or the like, for time-consuming perusal, and need not have extensive knowledge of the commands associated with the particular switching system database.

21 Claims, 3 Drawing Sheets

U.S. PATENT DOCUMENTS

| | | | |
|---|---|---|---|
| 6,640,143 B1 * | 10/2003 | Lee et al. | 700/32 |
| 6,684,190 B1 * | 1/2004 | Powers et al. | 705/36 R |
| 6,711,241 B1 * | 3/2004 | White et al. | 379/88.17 |
| 6,711,715 B1 * | 3/2004 | Grealish | 715/504 |
| 6,714,637 B1 * | 3/2004 | Kredo | 379/215.01 |
| 6,731,625 B1 * | 5/2004 | Eastep et al. | 370/352 |
| 6,754,702 B1 * | 6/2004 | Kennelly et al. | 709/223 |
| 6,785,268 B1 * | 8/2004 | Tasaki et al. | 370/366 |
| 6,801,617 B1 * | 10/2004 | Porter | 379/242 |
| 6,865,216 B1 * | 3/2005 | Beamish et al. | 375/140 |
| 7,099,664 B1 * | 8/2006 | Hurst | 455/428 |
| 2001/0012356 A1 * | 8/2001 | McDuff et al. | 379/265.02 |
| 2001/0044132 A1 * | 11/2001 | Houts | 435/69.1 |
| 2001/0054097 A1 * | 12/2001 | Chafe | 709/224 |
| 2002/0007363 A1 * | 1/2002 | Vaitzblit | 707/202 |
| 2002/0064149 A1 * | 5/2002 | Elliott et al. | 370/352 |
| 2003/0064978 A1 * | 4/2003 | Walpole et al. | 514/212.02 |
| 2003/0220820 A1 * | 11/2003 | Sears et al. | 705/3 |
| 2003/0225654 A1 * | 12/2003 | Chavas et al. | 705/36 |
| 2004/0052343 A1 * | 3/2004 | Glaser et al. | 379/88.22 |
| 2006/0053468 A1 * | 3/2006 | Sudoh et al. | 725/135 |
| 2007/0060212 A1 * | 3/2007 | Shah | 455/572 |

* cited by examiner

METHOD AND APPARATUS FOR IMPORTING DIGITAL SWITCHING SYSTEM DATA INTO A SPREADSHEET PROGRAM

BACKGROUND OF THE INVENTION

1. Field of the Invention

The present invention generally relates to digital switches and digital switching systems used in telecommunication networks. More particularly, the present invention relates to the access, viewing, and modification of data output by digital switches/switching systems for diagnostic, maintenance, and other purposes.

2. Background

Modern digital switches and digital switching systems such as the widely used 5ESS® (a registered trademark of Lucent Technologies, Inc., the assignee of the present invention) are responsible for efficiently switching large volumes of telephone calls and the likes. Such switches are used in and between a variety of telecommunications systems such as Public Switched Telephone Networks (PSTNs), Private Branch Exchanges (PBXs), and mobile telephone networks, to name a few.

For a variety of reasons such as diagnostics, field testing, and software maintenance, digital switches such as the 5ESS® output and store a database of raw data which keeps track of switch hardware changes, switch software changes, switching activities, and responses to testing, troubleshooting routines, new product installation, and other things.

Prior art switch data retrievers require that users retrieving switch data have extensive knowledge about the particular switch database involved by being proficient in the special query commands peculiar to the switch database. For example, the 5ESS® switch outputs Recent Change and Verify (RC/V) data which when using prior art methods must be accessed one entry at a time using the RC/V screens. Alternatively, a group of RC/V screen data can be downloaded into a large text file through which the user must sift.

Direct access to the RC/V screens requires knowledge of a large number of access keys, of which the user may not be familiar, or as a substitute, a user must execute a large number of time-consuming query commands to identify such keys. Such keys may vary from switch database to switch database and depend on many factors which may not be familiar to the user, including the data provisioning of the particular switch.

What is of great interest but heretofore unavailable, is a user-friendly switch data retriever with rapid switch data access, and which is not dependent (on the user's end) upon the peculiarities of the particular switch database involved.

SUMMARY OF THE INVENTION

In view of the aforementioned problem and deficiencies of the prior art, the present invention provides, in a telecommunication system, a method of providing a user with data from a digital switching system. The method at least includes the steps of receiving raw data output from a digital switch, and, via a converter, converting the raw data into a format compatible with a predefined spreadsheet program. The method also at least includes the step of outputting converted data to and storing the converted data in at least one predefined workbook of the spreadsheet program.

The present invention also provides, in a telecommunication system, an apparatus for providing a user with data from a digital switching system. The apparatus at least includes a data receiver adapted to receive raw data from a digital switch. The apparatus also includes a data converter coupled to the data receiver and adapted to convert raw data into a format compatible with a predefined spreadsheet program. And, the apparatus at least includes a data output device coupled to an output of the data converter. The data output device is adapted to transmit and store converted data to at least one predefined workbook of the spreadsheet program.

BRIEF DESCRIPTION OF THE DRAWING FIGURES

Features and advantages of the present invention will become apparent to those skilled in the art from the description below, with reference to the following drawing figures, in which.

DESCRIPTION OF THE PREFERRED EMBODIMENTS

1. Basic Switch Data Examiner Hardware and Operation

Figure 1:
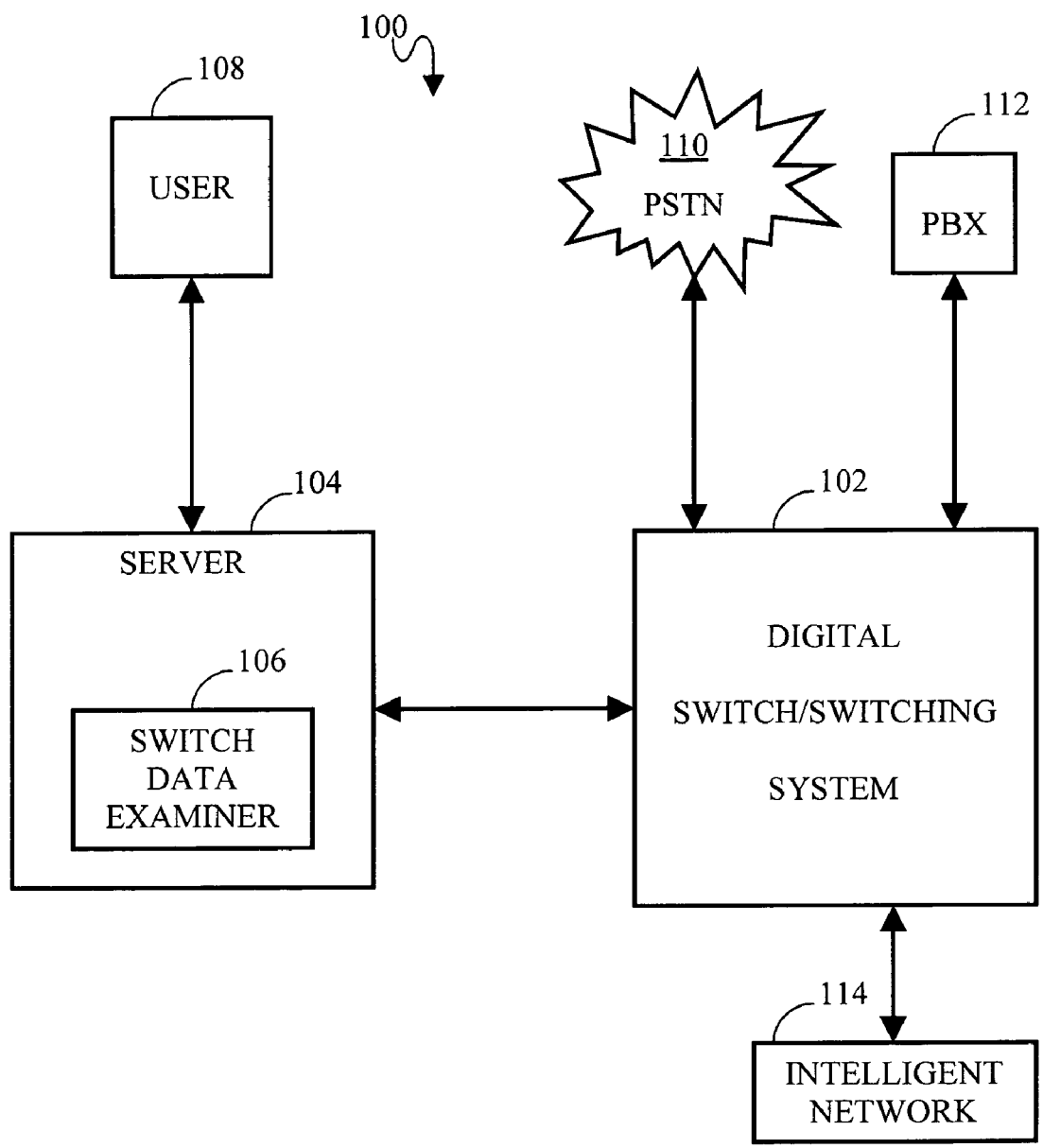
FIG. 1 is a schematic block diagram of a basic switch data system using the present-inventive apparatus ("switch data examiner")

The switch data examiner 106 incorporating the present invention is part of the switch data system 100 shown in FIG. 1. The switch data system 100 includes a digital switch/switching system 102 for switching the telephone calls and transactions of one or more telephone networks such as a Public Switched Telephone Network (PSTN) 110, a Private Branch Exchange (PBX) 112, and an Intelligent Network (IN) 114. The aforementioned 5ESS® serves as the digital switch 102 in the preferred embodiment. However, those skilled in the art will recognize that other digital switches can be used without departing from the scope and spirit of the present invention.

Switch data from the digital switch 102 is output to a server 104 in the present embodiment. The server 104 contains the present-inventive Switch Data Examiner (SDE) 106 for the efficient accessing, converting and displaying of switch data. The converted data is output to a user's computer 108. Those skilled in the art will also appreciate that the SDE 106 need not reside in a server, but could be installed in a user's computer (or PC) 108 instead.

The SDE 106 converts the raw data received from the digital switch 102 into a format compatible with the Microsoft® Excel program. The present invention is not limited to use with the Microsoft® Excel program, but is also operational with spreadsheet programs in general. Once the raw data is available from the digital switch 102, the user can execute a "Make Workbook" Command via the SDE 106. The user can also program Scripts as are known in the art for automatically running Query Commands to obtain and then transfer raw data on a periodic basis at the switch 102. The Query Commands are executed at the digital switch 102, and the data is transferred to the SDE 106. The SDE 106 then imports the data into a spreadsheet Workbook specified by the user. Also, the output of the SDE 106 can be used as a layout to prepare scripts that can be transferred to the data switch 102 and executed there to make changes to the switch database.

The user-friendly nature of the present invention lends itself to many uses, including but not limited to, digital switch and database analysis and troubleshooting, new product introduction testing to insure proper operation in the field of laboratory-tested digital switches, and customer acceptance testing procedures to insure that a switch functions properly for a customer when installed.

2. Detailed Switch Data Examiner Operation

Figure 2:
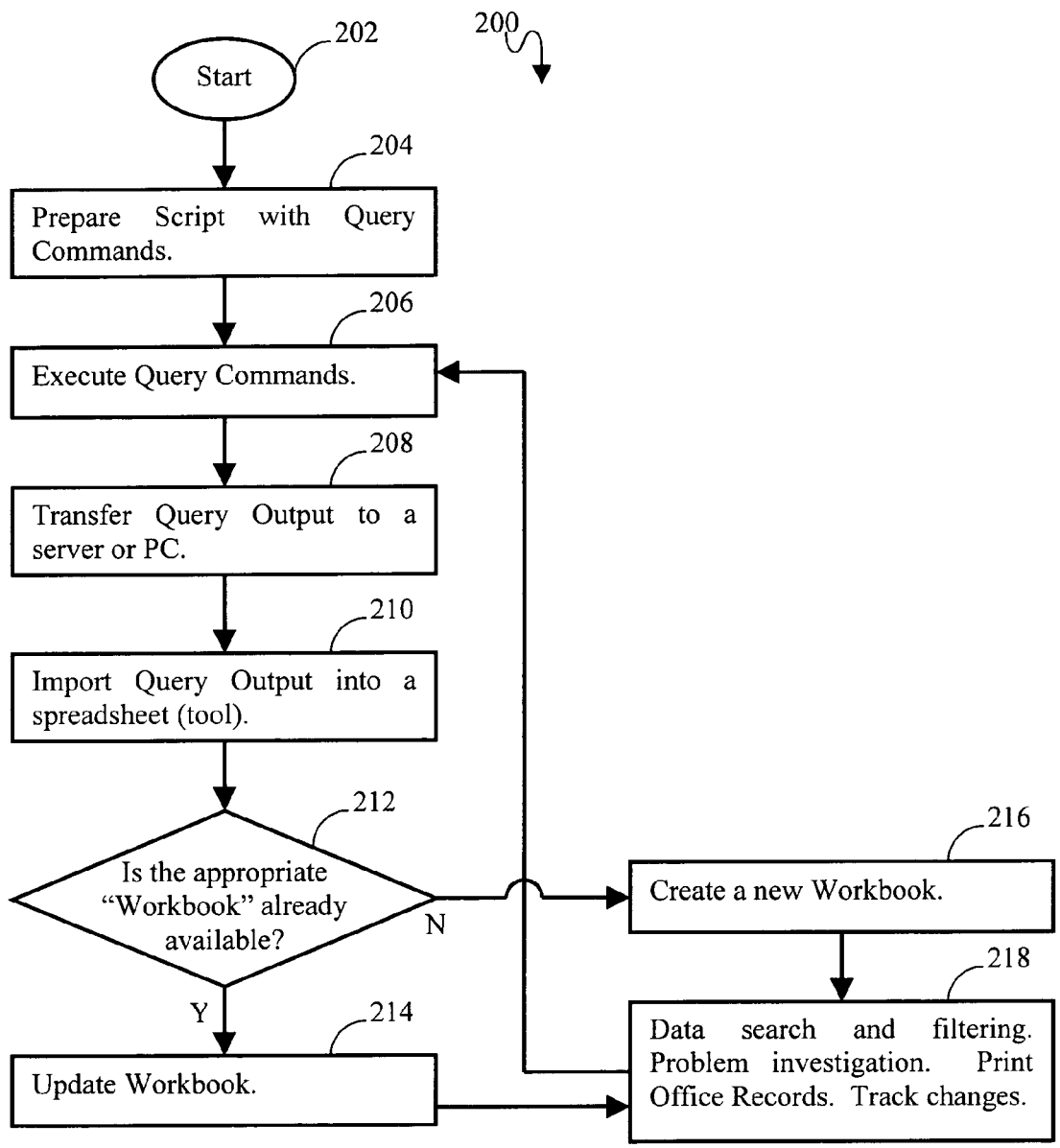
FIG. 2 is a flowchart/algorithm detailing the process overview of the present-inventive switch data examiner.
Figure 3:
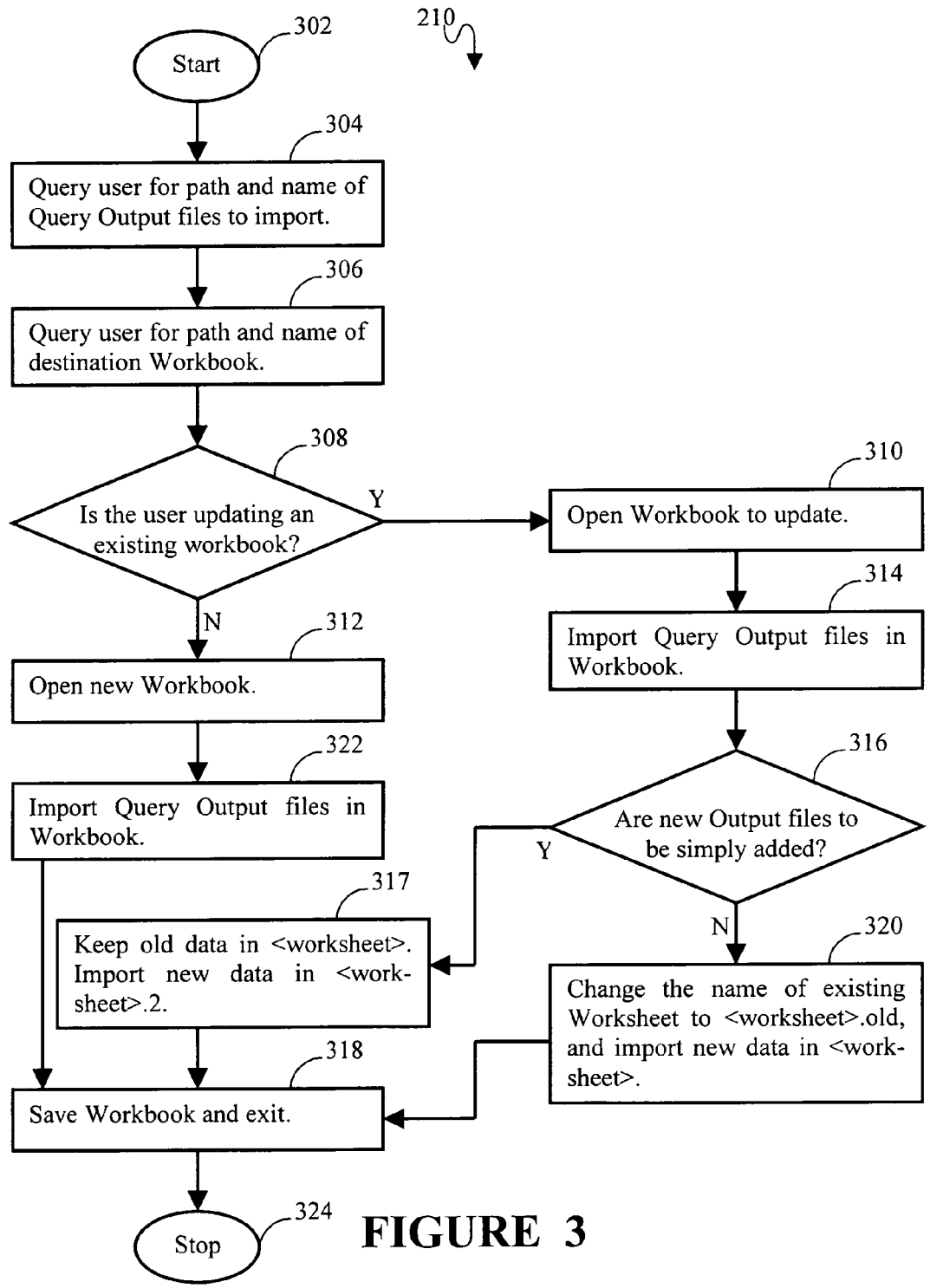
FIG. 3 is a flowchart/algorithm detailing the step in the algorithm of FIG. 2 regarding importing a Query Output into a spreadsheet program.

The algorithm 200 for requesting and importing switch data into a spreadsheet program is illustrated in FIGS. 2 and 3.

After the start (Step 202) of the algorithm 200, the user prepares a Script including Query Commands for periodic execution. The Scripts are executed in Step 206, and this action causes the switch data to be output from the switch 102. The SDE 106 converts the switch data and imports it into the spreadsheet Workbook specified by the user in Step 210. Step 210 is detailed in FIG. 3, infra.

If the Workbook specified by the user is available, its Worksheets are updated (Steps 212 and 214). If the specified Workbook is not available, then a new Workbook is created.

Referring to FIG. 3, the Query Data importing step (210) is described in more detail. After the start (Step 302), the user is asked for the path and name of the Query Output files of the switch 102 that the user desires in Step 304. Next, the user is queried for the path and name for the Workbook that will store the updated switch data in Step 306. If the Workbook specified in Step 306 exists, it is opened so that one or more of its Worksheets can be updated (Steps 308 and 310). If the Workbook specified in Step 306 does not exist, a new Workbook is established and opened (Steps 308 and 312).

When the Workbook already exists, the Query Output data files are imported into the Workbook in Step 314. This is followed by Step 316, in which the algorithm determines whether the Output data files are simply to be added to the existing Workbook. If so, the old data is stored in the worksheet designated <worksheet>, while the new data is imported into the worksheet designated <worksheet>0.2 (Step 317). The Workbook is saved with the new data (Step 318) stored in the second version of the Worksheet (the old data Worksheet name is not changed). If the name of the new output data worksheet is to be the same as the old output data worksheet (in order to execute tools for data comparison, for example), then the name of the existing worksheet is changed to indicate that it is an older version, and the new data is imported with the desired worksheet name (Step 320). Thereafter, the Workbook is saved in Step 318, followed by the end of this portion of the software at Step 324.

Returning to Step 312, having created a new Workbook, the SDE imports the Query Output files in said Workbook in Step 322.

Variations and modifications of the present invention are possible, given the above description. However, all variations and modifications which are obvious to those skilled in the art to which the present invention pertains are considered to be within the scope of the protection granted by this Letters Patent.

What is claimed is:

1. In a telecommunication system, a method of retrieving data from a digital switching system, said method comprising the steps of:

receiving raw switch data from a digital switching system, wherein the raw switch data is stored by the digital switching system in a switch database;

via a converter, converting said raw switch data into a format compatible with a predefined spreadsheet program; and outputting converted data to and storing said converted data in at least one predefined workbook of said spreadsheet program.

2. The method in claim 1 further comprising the steps of:

prior to said receiving, converting and outputting steps, installing said digital switching system; and performing said receiving, converting and outputting steps as part of a New Product Introduction test.

3. The method in claim 2 further comprising the steps of:

using the output of said converter as a layout, preparing scripts containing Database Modification Commands;

transferring said scripts to said digital switching system; and via said digital switching system, executing said scripts to modify the switch database associated with the raw switch data.

4. The method in claim 1 further comprising the steps of:

prior to said receiving, converting and outputting steps, installing said digital switching system; and performing said receiving, converting and outputting steps as part of a Customer Acceptance test.

5. The method in claim 4 further comprising the steps of:

using the output of said converter as a layout, preparing scripts containing Database Modification Commands;

transferring said scripts to said digital switching system; and via said digital switching system, executing said scripts to modify the switch database associated with the raw switch data.

6. The method in claim 1 further comprising the steps of:

using the output of said converter as a layout, preparing scripts containing Database Modification Commands;

transferring said scripts to said digital switching system; and via said digital switching system, executing said scripts to modify the switch database associated with the raw switch data.

7. The method in claim 1 wherein the raw switch data includes at least one of hardware change data, software change data, switching activity data, testing data, troubleshooting data, and new product installation data.

8. The method in claim 1 wherein the raw switch data includes recent change and verify data.

9. The method in claim 1 further comprising the steps of:

preparing scripts containing Database Modification Commands;

transferring said scripts to said digital switching system; and via said digital switching system, executing said scripts to modify the switch database associated with the raw switch data.

10. In a telecommunication system, an apparatus for retrieving data from a digital switching system, said apparatus comprising:

a data receiver adapted to receive raw switch data from a digital switching system, wherein the raw switch data is stored by the digital switching system in a switch database;

a data converter coupled to said data receiver, said data converter adapted to convert said raw switch data into a format compatible with a predefined spreadsheet program; and a data output device coupled to an output of said data converter, said data output device adapted to transmit and store converted data to at least one predefined workbook of said spreadsheet program.

11. The apparatus in claim 10 wherein the operation of said data receiver, data converter and data output device are adapted to be triggered via a user's "Make Workbook" Command.

12. The apparatus in claim 10 wherein the raw switch data includes at least one of hardware change data, software change data, switching activity data, testing data, troubleshooting data, and new product installation data.

13. The apparatus in claim 10 wherein the raw switch data includes recent change and verify data.

14. In a telecommunication system, a method of retrieving data from a digital switching system, said method comprising the steps of:

receiving raw switch data from a digital switch;
   via a converter, converting said raw switch data into a format compatible with a predefined spreadsheet program; and
   outputting converted data to and storing said converted data in at least one predefined workbook of said spreadsheet program.

15. The method in claim 14 further comprising the steps of:

using the output of said converter as a layout, preparing scripts containing Database Modification Commands;
   transferring said scripts to said digital switch; and
   via said digital switch, executing said scripts to modify a switch database associated with the raw switch data.

16. The method in claim 14 wherein the raw switch data includes at least one of hardware change data, software change data, switching activity data, testing data, troubleshooting data, and new product installation data.

17. The method in claim 14 wherein the raw switch data includes recent change and verify data.

18. In a telecommunication system, an apparatus for retrieving data from a digital switching system, said apparatus comprising:

a data receiver adapted to receive raw switch data from a digital switch;
   a data converter coupled to said data receiver, said data converter adapted to convert said raw switch data into a format compatible with a predefined spreadsheet program; and
   a data output device coupled to an output of said data converter, said data output device adapted to transmit and store converted data to at least one predefined workbook of said spreadsheet program.

19. The apparatus in claim 18 wherein the operation of said data receiver, data converter and data output device are adapted to be triggered via a user's "Make Workbook" Command.

20. The apparatus in claim 18 wherein the raw switch data includes at least one of hardware change data, software change data, switching activity data, testing data, troubleshooting data, and new product installation data.

21. The apparatus in claim 18 wherein the raw switch data includes recent change and verify data.

* * * * *